United States Patent Office 3,439,053
Patented Apr. 15, 1969

3,439,053
α-CHLOROALKYLLITHIUM COMPOUNDS
Donald F. Hoeg, Mount Prospect, Ill., assignor to Borg-Warner Corporation, Chicago, Ill., a corporation of Illinois
No Drawing. Filed May 28, 1965, Ser. No. 459,940
Int. Cl. C07f 1/02
U.S. Cl. 260—665                                    6 Claims

ABSTRACT OF THE DISCLOSURE

A new class of organolithium compounds that are stable mono-, di- and trichloromethyllithium compounds and a method of preparing stable alpha-chloroalkyllithium compounds by reacting polychloromethanes with lower alkyllithium compounds such as N-butyllithium in tetrahydrofuran at low temperatures and preferably below —70° C.

A new class of organolithium compounds that are stable mono-, di- and trichloromethyllithium compounds useful as reagents in preparing chemical intermediates and polymers and a method of preparing the stable α-chloroalkyllithium compounds by reacting polychloromethanes with lower alkyllithium compounds such as N-butyllithium in tetrahydrofuran at low temperatures and preferably below —70° C.

Organolithium compounds have proved to be extremely versatile compounds for use in organic synthesis. They undergo all of the reactions typical of the well-known Grignard reagents, and due to their higher reactivity, several other reactions as well. Some of their typical reactions include halogen metal interconversion, hydrogen-metal exchange (metalation), coupling with alkyl or aryl halides (a Wurtz-Fittig type reaction), addition to unsaturated centers, e.g., addition to carbon dioxide to yield acid salts, addition to carbonyl groups to provide alcohol derivatives, addition to olefines, and addition to unsaturated centers containing hetero atoms such as azomethine linkages. The organolithium compounds, unlike the Grignard reagents, also add to reactive olefinic bonds. When the organolithium compounds are used in catalytic amounts, they may be reacted with active olefines and diolefines to provide commercially useful polymers and copolymers. These polymerizations are characterized by the fact that they are essentially free of termination events and the active ionic polymer chain end is said to be "living." With sequential addition of olefines and diolefines to these "living" polymers, a great variety of block copolymers may also be obtained, depending of course, upon the reaction conditions such as temperature, solvent, etc. The stereochemistry of reactive conjugated diolefines may also be influenced by these reaction conditions.

Organolithium compounds have heretofore been prepared by a number of methods, e.g., reaction of lithium metal with organomercury compounds, reaction between lithium metal and an alkyl halide, halogen-metal exchange reaction, and the metalation reaction mentioned above.

Prior to this invention, α-chloroalkyllithium compounds were thought to have transient existence in reactions of alkyl halides and polyhalomethanes with alkyllithium compounds although repeated attempts to detect their presence had failed. It has been discovered. however, that tetrahydrofuran exerts a remarkable stabilizing influence on these structures and it is now possible to isolate these compounds at completely stable reagents below about —65° in tetrahydrofuran. The reagents of this invention will be useful in the preparation of many compounds.

The present invention is directed to relatively stable mono-, di- and trichloromethyllithium compounds that were heretofore thought to be incapable of isolation. The compounds of this invention are generally represented by the formula

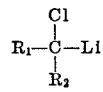

wherein $R_1$ and $R_2$ may be selected from the group consisting of Cl, H, alkyl and aryl groups. When $R_1$ and $R_2$ are $C_6H_5$, the resulting compound will be diphenyl chloromethyllithium. When $R_1$ is $C_6H_5$ and $R_2$ is Cl, the resulting compound will be α,α-dichlorobenzyllithium. When $R_1$ is H and $R_2$ is Cl, the resulting compound will be dichloromethyllithium. When $R_1$ and $R_2$ are H, the resulting compound will be chloromethyllithium, and when $R_1$ and $R_2$ are Cl, the resulting compound will be trichloromethyllithium.

In accordance with this invention, the compounds may be prepared by reacting polychloromethanes with a lower alkyllithium compound, e.g., n-butyllithium in tetrahydrofuran at very low temperatures, preferably below —70° C. When substituted chloromethanes, i.e., in which a hydrogen atom is linked to the same carbon atom as the chlorine atom, are reacted, the reaction proceeds in the following manner via a hydrogen-metal interchange reaction.

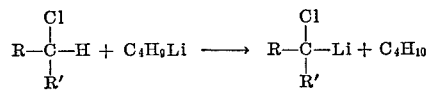

Alternatively, when fully substituted polychloromethanes are reacted, i.e., those wherein these are no hydrogen atoms attached to the carbon atom to which the chlorine atoms are attached, the reaction proceeds in the following manner via halogen-metal interchange:

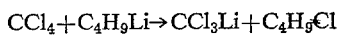

Additionally, polychloromethanes may be used in which other than chlorine, e.g., bromine and/or iodine, atoms are present on the central carbon atom.

The compounds of this invention appear partly insoluble in the reaction medium and appear to precipitate, possibly solvated, out of the tetrahydrofuran at —100°. The preparation of the stable α-chloroalkyllithium compounds of this invention may take place at about —100° C. up to about —70° C., however, with mixed solvent systems, temperatures below —110° C. may be used. These compounds are indefinitely stable at —100° C. and can be stored with little or no decomposition.

The compounds of this invention have been characterized by hydrolysis, deuterolysis, and direct carbonation to the corresponding acids. Thus, the reaction of n-butyllithium in tetrahydrofuran at —100° C. with either benzal chloride (via hydrogen-metal interconversion) or benzotrichloride (via halogen-metal interconversion) results in the same product, i.e., α,α - dichlorobenzyllithium (I) as illustrated by the following series of reactions.

α,α-Dichlorobenzyllithium

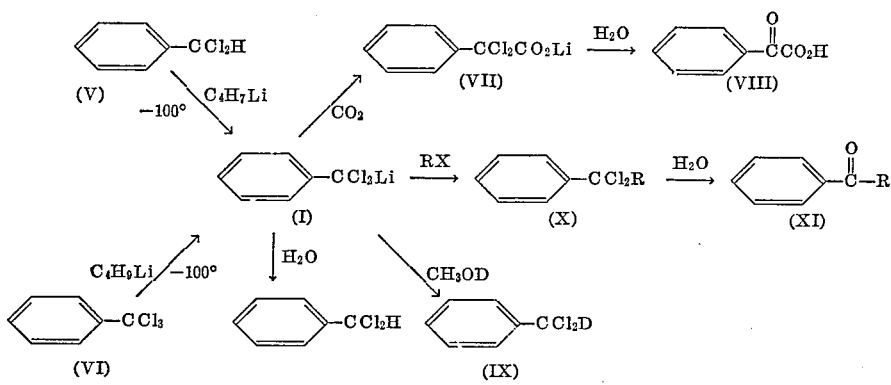

Carbonation of I yields the lithium salt of α,α-dichlorophenylacetic acid (VII), which on dissolving in water rapidly liberates HCl and forms phenylglyoxylic acid (VIII).

Hydrolysis of I yields benzal chloride and methanolysis with $CH_3OD$ yields benzal chloride-α-$D_1$ (IX).

Reaction of I with methyl iodide or benzyl chloride produces the α,α-dichloroalkylbenzene (X) and hydrolysis leads to the ketone (XI) identified as the 2,4-dinitrophenylhydrazone (dehydrochlorination of X yields the α-chloroolefine).

In view of the extremely low temperatures of these reactions and the rapidity of the displacement reactions with methyl iodide and benzyl chloride, the α,α-dichlorobenzyl carbanion would appear to be a moderately strong nucleophile. All of these compounds may be isolated in pure form in good yields (50–80%). While the α,α-dichlorobenzyllithium reacts rapidly with methyl iodide and benzyl chloride, it is completely unreactive toward less reactive alkyl halides, like butyl chloride, at —80°.

The other α-chloroalkyllithium compounds of this invention, i.e., other than α,α-dichlorobenzyllithium, may be prepared and identified as above. The acids and yields derived on carbonation of the organolithium structures are shown in Table I.

TABLE I.—CARBONATION OF α-CHLOROALKYLLITHIUM COMPOUNDS

| Starting Poly-chloromethane | α-Chloro-alkyl-lithium Formed | Acid From Carbonation | α-Chloro-alkyl-lithium Percent Yield |
|---|---|---|---|
| φCCl₃ | | φCCl₂Li | φCOCO₂H | 70 |
| φCHCl₂ | | | | 50 |
| φ₂CCl₂ | φ₂CClLi | φCOHCO₂H | 40 |
| CCl₄ | | Cl₃CLi | Cl₃CCO₂H | 80 |
| CHCl₃ | | | | 50 |
| Cl₂CH₂ | Cl₂CHLi | Cl₂CHCO₂H | 60 |

Cyclopropane synthesis

While these compounds are indefinitely stable at —100° up to —80°, they decompose spectacularly and exothermally above —65°. Dichloromethyllithium was somewhat more stable and decomposed at about —35° to —40°. The precipitate dissolves, and the temperature increases rapidly for about 20° C. while the color of the solution darkens substantially. This change is irreversible, i.e., recooling does not reform the original conditions and carbonation of the mixture after the decomposition does not produce any acid fragments.

If olefines are present during the decomposition of α,α-dichlorobenzyllithium and trichloromethyllithium, high yields of the corresponding cyclopropanes are obtained. The reaction proceeds as follows:

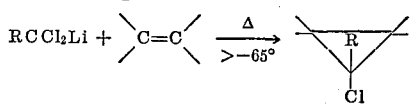

TABLE II

| R | Olefine | Percent Yield Cyclopropane |
|---|---|---|
| φ | Tetramethylethylene | 70 |
| Cl | Cyclohexane | 60 |
| | 1,1-diphenylethylene | 70 |
| | Tetramethylethylene | 70 |
| | Butadiene | 50 |

If butadiene or other conjugated olefines are present during the decomposition of trichloromethyllithium, the product is 1,1-dichloro-2-vinylcyclopropane:

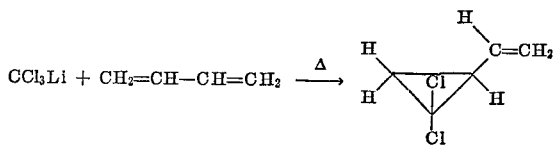

The decomposition of the α-chloroalkyllithium (in the absence of cyclopropane ring formation) leads to unsaturated dimeric products, as illustrated by the reaction of diphenylchloromethyllithium:

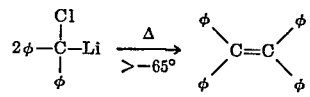

In this reaction, tetraphenylethylene is formed. Polymeric byproducts are often also observed.

The following examples will illustrate the preparation of the compounds of this invention, as well as some of the more typical reactions of these compounds.

Example 1.—Preparation and carbonation of α,α-dichlorobenzyllithium from benzal chloride 7.34 g. of benzal chloride, 45.6 mmoles was added to 100 ml. pure dry tetrahydrofuran. The reaction was cooled to —90° and 43 mmoles of n-butyllithium was added slowly over ten minutes. After a total of fifteen minutes elapsed, the reaction was poured into powdered Dry Ice. The Dry Ice was allowed to vaporize and the tetrahydrofuran layer partially evaporated. A mixture of equal volumes of benzene and water was added, anticipating separation of the lithium salt of the acid in the aqueous phase. The aqueous phase became progressively more acid and was made basic with caustic. The aqueous phase was separated, acidified, and extracted with ethyl ether. The ether phases were combined and vacuum stripped to yield an orange liquid which was fractionally distilled. 2.7 g. of product were isolated. The isolated product boiled at 131–133° C. at 6–7 mm. mercury. The product was a very pale green liquid, which crystallized on standing a few moments to yield a white solid. The product was recrystallized from cyclohexane and had a melting point of 63–64.5°. The product was identified as phenylglyoxylic acid (literature melting point 66°, boiling point, 147–151°, at 12 mm. Hg). The yield was 2.7 g., 42% of theory based on n-butyllithium used.

Example 2.—Preparation of α,α-dichlorobenzyllithium from benzotrichloride 9.62 g., 49.2 mmoles of α,α,α-trichlorotoluene was dissolved in 100 ml. of pure dry tetrahydrofuran and cooled to −100° C. 49 mmoles of n-butyllithium in 34 ml. of a hexane solution was added slowly over a period of forty-five minutes. 1¼ hours after the start of the reaction, the mixture was poured into stirred, powdered Dry Ice. The product was recovered as in Example 1 (7.1 g. of acid fraction), to yield 0.25 g. of an acid boiling between 73 and 109° at 0.3 mm. and 5.5 g. (75% yield) of phenylglyoxylic acid (boiling point 100–110° at 0.3 mm.). The acid crystallized as it was distilled.

Example 3.—Preparation of 1-chloro-1-phenyltetramethylcyclopropane from α,α-dichlorobenzyllithium (benzal chloride derived)

9.47 g., 58.8 mmoles of benzal chloride was dissolved in 125 ml. of dry tetrahydrofuran and cooled to −100°; 42 ml., 60 mmoles of n-butyllithium in hexane was added slowly over a period of 25 minutes. Forty-five minutes after the start of the reaction, a pale lavender slurry was obtained. 40 ml. of tetramethylethylene was added slowly over fifteen minutes. There was no apparent reaction and the color remained the same. After a total of one hour, the reaction was allowed to warm slowly. At about −65° C., an increase in temperature occurred (to −40° C.), the precipitate disappeared and a deep red solution formed. The reaction was poured into a beaker and the solvent evaporated. A crystalline residue was obtained, which dissolved in a 50/50 mixture of water/ethyl ether. The ether phase was separated, dried and stripped. An amber solid was obtained. The solid dissolved readily in petroleum ether. On evaporating, prisms formed to yield 5.0 g. of product (melting point 61–62°). The water phase was cooled and an additional 0.8 g. were isolated. The .8 g. were shown (by IR) to be the same compound. Evaporation of the water phase yielded 2 g. of a viscous yellow fluid. A sample of the crystalline solid was recrystallized from petroleum ether and identified as 1-chloro-1-phenyltetramethylcyclopropane (melting point sharp 65–66°, literature 66–67°). The infrared spectrum showed strong absorption at 1022 cm.$^{-1}$, indicating the presence of cyclopropane rings. The yield of cyclopropane (4.8 g.) was 48%. (Utilizing benzotrichloride in this example yielded 70% cyclopropane.)

Example 4.—Reaction of α,α-dichlorobenzyllithium with methyl iodide

α,α-Dichlorobenzyllithium in 100 ml. of tetrahydrofuran was prepared from 49.3 mmoles, each of benzotrichloride and n-butyllithium as in Example 2, at −100°. 5 ml. of methyl iodide in 15 ml. of tetrahydrofuran was added to this mixture over a thirty-minute period. The lavender slurry became a brown color after three hours. The reaction was quenched with 4 ml. of methanol in 10 ml. of tetrahydrofuran added dropwise. The reaction was poured into 200 ml. of water and the organic phase was separated. The aqueous phase was washed with ethyl ether and separated. The organic phases were combined and dried over $Na_2SO_4$ and vacuum stripped. The liquid residue was fractionally distilled under vacuum to yield 6.6 g. (77%) of a clear liquid identified as α,α-dichloroethylbenzene (boiling point 54° at 0.4 mm. Hg).

The distillate was stirred overnight with refluxing water (50 ml.) to yield acetophenone, which was characterized as the 2,4-dinitrophenylhydrazone (9 g., 82%, melting point 252–254°). The α,α-dichloroethylbenzene compound dehydrochlorinated on standing or gentle heating. The reaction of Example 4 was repeated at −80° C. to yield 82% α,α-dichloroethylbenzene. In contrast, no significant reaction of α,α-dichlorobenzyllithium with n-butyl chloride was detected at −80°.

Example 5.—Preparation of trichloromethyllithium from chloroform and n-butyllithium 12.46 g., 104 mmoles of chloroform was dissolved into 130 ml. of tetrahydrofuran and cooled to −105° C. 104 mmoles of n-butyllithium in 73 ml. hexane was added very slowly over a forty-five minute period. The reaction mixture darkened rapidly after the first few drops and changed from a purple to a green slurry. After 1¼ hours (including addition time), the reaction was poured into stirred Dry Ice. The Dry Ice was evaporated along with the solvent on a steam bath and a semicrystalline brown residue remained. 150 ml. of water was added and a major portion of the residue dissolved. After extraction with ethyl ether, the aqueous phase was acidified and again extracted with ethyl ether. The aqueous phase was re-extracted four times with ether. The ether phases were combined, dried and vacuum stripped to yield 6.7 g. of a red oil, which was vacuum distilled. On distillation, the liquid yielded a clear liquid distillate (4.0 g.) boiling at 66–69° at 0.6 mm. mercury, which partially crystallized on standing. About half was pure white crystals and the other half clear liquid (which crystallized slightly below room temperature). The infrared spectra of both were very similar to a standard spectrum of trichloroacetic acid. The solid was deliquescent and identified as predominantly trichloroacetic acid containing a small portion of dichloroacetic acid.

Example 6.—Synthesis of trichloromethyllithium from $CCl_4$ and N-butyllithium at −100°

5.6 g., 36.5 mmoles of carbon tetrachloride was dissolved in 100 ml. of pure tetrahydrofuran and cooled to −105°, 26 ml., 37 mmoles of n-butyllithium was added over a thirty-minute period. A mild exotherm occurred and the mixture changed in color from colorless to pale pink. A white precipitate became visible after about half the butyllithium was added. One hour after the start of the reaction, the solution was a white slurry. 1½ hours from the start of the reaction, it was poured into stirred powdered Dry Ice and prepared as indicated in Example 5. All of the acid distilled at 69.5° at 0.4 mm. and crystallized in the condenser. 4.5 g. of acid was isolated. The infrared spectrum identified the product as trichloroacetic acid (76% yield).

Example 7.—Preparation of 7,7-dichrlorobicyclo-(4.1.0)-heptane (dichloronorcarane) from trichloromethyllithium and cyclohexene 7.98 g., 52 mmoles of carbon tetrachloride was dissolved in 100 ml. tetrahydrofuran and cooled to −105°. 35 ml., 52 mmoles of n-butyllithium-hexane solution was added slowly over a forty-five minute period. 30 ml. of cyclohexene was slowly added to the gray precipitate of trichloromethyllithium. The reaction warmed slowly (by lowering cooling bath). At −65° C., a color change occurred and solution of the precipitate occurred as the temperature rose from −63° to −38°. The solution turned dark. The solvent was evaporated and the liquid-salt residue distilled to yield 5.2 g. (60%) of a clear liquid identified as dichloronorcarane (boiling point 94–96° at 30 mm. mercury). The infrared was identical to a standard spectrum of this compound and confirmed the presence of cyclopropane rings (strong 1022 cm.$^{-1}$ absorption).

Example 8.—Preparation of 1,1-dichloro-2,2-diphenyl-cyclopropane from trichloromethyllithium and 1,1-diphenylethylene 7.93 g., 51.4 mmoles of carbon tetrachloride and 24 g. of 1,1-diphenylethylene were dissolved in 100 ml. of tetrahydrofuran and cooled to −100°. 51 mmoles of n-butyllithium in 34 ml. of a hexane solution was added dropwise over a period of forty-five minutes. After 1½ hours at −100°, the cooling bath was removed and the mixture warmed. Exotherm occurred at about −60° and the slurry turned dark. At room temperature the reaction mixture was poured into 200 ml. of water atnd the organic phase was separated. The aqueous phase was extracted several times with ethyl ether. The organic phases were combined, dried over $Na_2SO_4$ and vacuum stripped. A solid crystallized out when the solvent was stripped off. This solid was recrystallized from petroleum ether to yield 7.0 g. of prism-shaped crystals identified as 1,1-dichloro-2,2-diphenylcyclopropane (melting point 113–114°).

Example 9.—Preparation and carbonation of diphenylchloromethyllithium 6.84 g., 28.8 mmoles of freshly distilled dichlorodiphenylmethane was added to 100 ml. of pure dry tetrahydrofuran and the reaction cooled to −100°. 27.5 mmoles of n-butyllithium in 19 ml. of hexane solution was added slowly over a half-hour period. The reaction became a deep red color. 1¼ hours after the start of the reaction, the mixture was poured into powdered Dry Ice and stored overnight. Approximately twelve hours later, water was added and it was found that the white residue was only sparingly soluble. The water solution was made basic with sodium hydroxide, stirred for one hour and filtered. The filtrate was extracted with ethyl ether and the aqueous layer was separated and acidified. The aqueous layer was extracted with ethyl ether and the ether phase was separated and vacuum stripped. 2.5 g. of a white, crystalline residue was obtained, which was crystallized from hot water and identified as a diphenylglycolic acid (melting point 150–151°, literature 150°) by infrared spectrum. The yield was approximately 40% based on n-butyllithium used.

Example 10.—Preparation and carbonation of dichloromethyllithium 3.95 g., 46.5 mmoles of methylene chloride was added to 100 ml. of pure dry tetrahydrofuran and the reaction was cooled to −95°. 46.5 mmoles in 31.5 ml. of a hexane solution was added dropwise to n-butyllithium. When the addition was approximately half complete, a white precipitate formed. After two hours, the reaction was poured into Dry Ice and allowed to stand for approximately twelve hours. The acid product was isolated as in the previous examples and distilled to yield 60% dichloroacetic acid (boiling point 90–91°). The identification was by infrared spectrum.

In the examples above, tetrahydrofuran was utilized as the solvent, however, it will be understood by those skilled in the art that other highly basic solvents may also be utilized, e.g., derivatives of tetrahydrofuran, ethylene glycol dimethyl ether, diethylene glycol dimethyl ether, etc.

It will be noted from reading the specification that the compounds of this invention have great potential as intermediates in the preparation of a variety of organic compounds and polymers. Also ordered polymers, e.g., stereoregular and block polymers, may be prepared utilizing those compounds described herein.

While this invention has been described with reference to specific examples and embodiments thereof, it will be understood that this is by way of illustration rather than limitation and the scope of the invention will be measured by the appended claims.

I claim:
1. A method of making stable, chloroalkyllithium compounds that will remain stable below −70° C., of the formula:

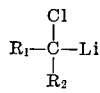

wherein $R_1$ and $R_2$ are selected from the group consisting of alkyl, aryl and chlorine, comprising the step of reacting at least one compound from the group consisting of alkyl, aryl and chlorine substituted chloromethane with an alkyllithium compound in a solvent consisting essentially of tetrahydrofuran at a temperature below −70° C.

2. The method of claim 1 wherein $R_1$ and $R_2$ of the formula are phenyl groups and the compound is diphenylchloromethyllithium.

3. The method of claim 1 wherein $R_1$ of the formula is a phenyl group and $R_2$ is chlorine and the compound formed is $\alpha,\alpha$-dichlorobenzyllithium.

4. A chloroalkyllithium compound that is stable at and below −70° C., said compound having been prepared and maintained in the presence of a solvent consisting essentially of tetrahydrofuran, said compound having the formula:

wherein $R_1$ and $R_2$ are selected from the group consisting of alkyl, aryl and chlorine.

5. The chloroalkyllithium compound of claim 4 wherein $R_1$ and $R_2$ are phenyl groups and the compound is diphenylchloromethyllithium.

6. The compound of claim 4 wherein $R_1$ is a phenyl group and $R_2$ is chlorine and the compound is $\alpha,\alpha$-dichlorobenzyllithium.

References Cited

Hoeg et al.: Am. Chem. Soc., Abstracts of Papers, 149th meeting, 1965, pp. 52P–53P.
Hoeg et al.: J. Am. Chem. Soc., 86 (1964), pp. 928–9.
Köbrich et al.: Angew. Chem., vol. 76 (1964), p. 536.
Köbrich et al.: Zeit. für Naturforschg, vol. 18b (1963), pp. 1125–6.
Miller et al.: J. Am. Chem. Soc., vol. 86 (1964), pp. 2089–90.
Holter et al.: Proc. North Dakota Acad. Science, vol. 17 (1963), pp. 31–2.

TOBIAS E. LEVOW, *Primary Examiner.*

A. P. DEMERS, *Assistant Examiner.*

U.S. Cl. X.R.

252—431; 260—346.1, 515, 539, 648, 666, 668

U.S. DEPARTMENT OF COMMERCE
PATENT OFFICE
Washington, D.C. 20231

UNITED STATES PATENT OFFICE
CERTIFICATE OF CORRECTION

Patent No. 3,439,053                                                      April 15, 19

Donald F. Hoeg

It is certified that error appears in the above identified patent and that said Letters Patent are hereby corrected as shown below:

Column 2, line 4, "at" should read -- as --; line 41, "these" should re -- there --. Column 3, Formula V, that portion of the formula reading "$C_4H_7Li$" should read -- $C_4H_9Li$ --. Column 5, line 55, "(4.8 g.)" should rea -- (5.8 g.)--. Column 7, line 12, "atnd" should read -- and --.

Signed and sealed this 7th day of April 1970.

(SEAL)
Attest:

Edward M. Fletcher, Jr.                                      WILLIAM E. SCHUYLER, JR
Attesting Officer                                                  Commissioner of Patents